May 20, 1958  L. NEWMAN  2,835,224
ADJUSTABLE DRY-FEED HOPPER AND TROUGH
Filed March 14, 1956

# United States Patent Office 2,835,224
Patented May 20, 1958

2,835,224
ADJUSTABLE DRY-FEED HOPPER AND TROUGH

Leslie Newman, Mount Hutton, New South Wales, Australia

Application March 14, 1956, Serial No. 571,478

Claims priority, application Australia March 15, 1955

3 Claims. (Cl. 119—55)

The invention relates to a dry-feed hopper, in which stored dry mash, grain or like nutriment is released for consumption, upon demand of livestock, by exercise of downward pressure upon a feed release mechanism.

Known feed hoppers designed for supply of dry feed to livestock and more particularly to poultry, in the main rely upon unassisted gravity flow from a hopper into a feed tray, to constantly replace food consumed from the tray. Such hoppers become inoperative when the food exposed in the tray becomes coagulated and prevents free flow of replenishment from the hopper. Coagulation frequently arises in wet weather, due to dampening of feed exposed in the feed tray, or the feed in the tray may become fouled and compacted by the livestock being fed.

The primary object of the present invention is to overcome the foregoing and other disadvantages of the prior art, by providing a feed hopper in which flow of feed is controlled and assisted by operation of a feed release mechanism by livestock seeking food.

A further object of the invention is to provide a feed hopper of simple and economical construction. Another object of the invention is to provide a convenient apparatus for dispensing dry granular stock feed, in response to feeding demand, with avoidance of waste or spoilage thereof.

Other objects and advantages of the invention will become apparent from the following description.

The invention consists in dry-feed dispensing apparatus comprising a dry-feed bin suitably mounted on a supporting framework from which granular feed is supplied by gravitational flow to a feed tray accessible to stock, by operation of feed flow control means, under the influence of the weight of a feed seeking entity such as a bird or animal upon a balanced tiltable feed platform.

Figure 1:
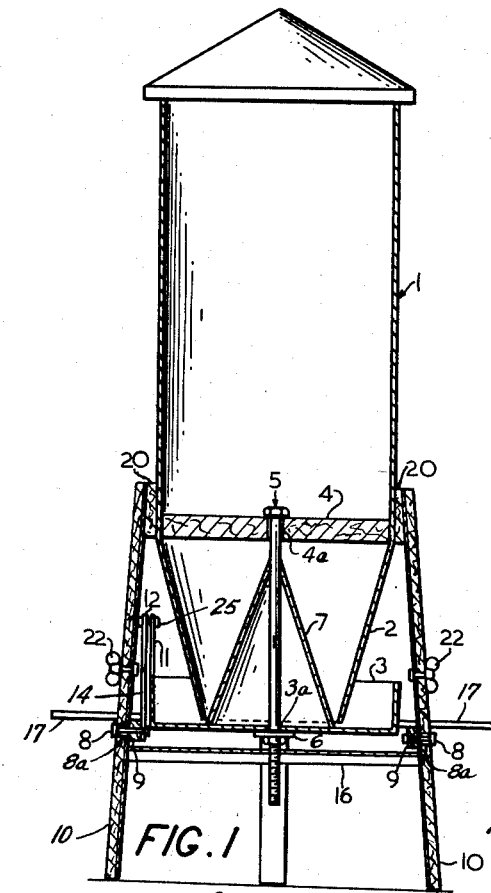
Figure 2:
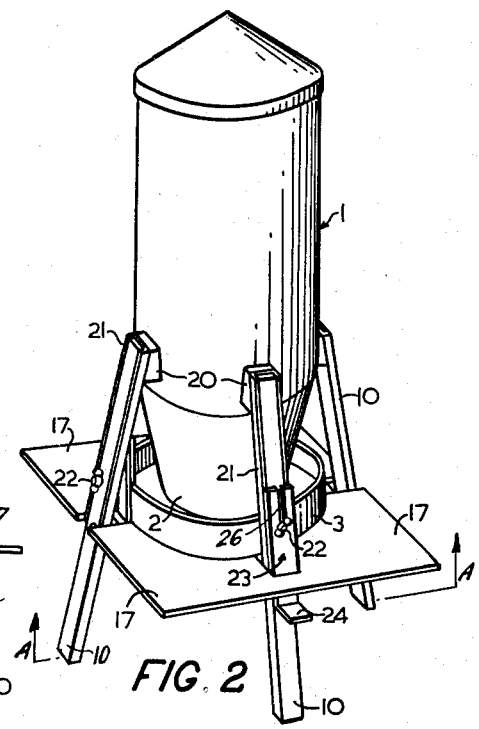
Figure 3:
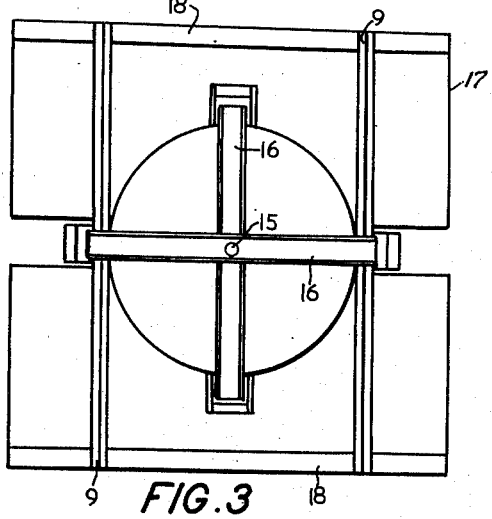
Figure 4:
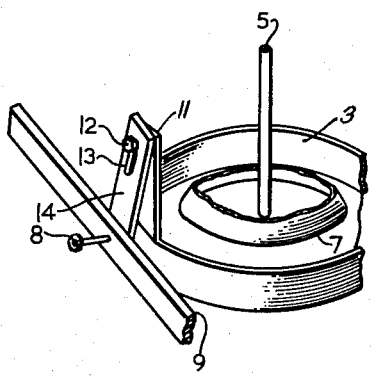

The invention is now more fully described with reference to the accompanying drawings in which, Fig. 1 is an elevation in half section, Fig. 2 is a perspective view of the apparatus on a reduced scale, Fig. 3 is an enlarged inverted plan view of Fig. 2 and Fig. 4 is a fragmentary perspective view of the feed tray indicated by reference numeral 3 in Figures 1 and 2, and the means whereby oscillating movement thereof is obtained upon tilting of the feed platform.

In the ilustrated embodiment the dry-feed bin 1 mounted on a supporting stand has a frustro-conical downwardly extending feed outlet 2 through which dry-feed may flow into a feed tray 3 of greater area than the feed outlet, thus providing a marginal trough around the feed outlet accessible to stock.

Within the dry feed bin there is provided a horizontal cross-member 4 from which is loosely suspended a feed tray supporting member consisting of a rod or tube 5 which extends downwardly through an oversized hole 4a beyond the feed outlet and passes through a central aperture 3a in the feed tray. The lower part of the feed tray supporting member is screw threaded and bears at least one cooperatively threaded nut 6 furnishing an adjustable annular flange upon which the feed tray rests with a desired clearance below the feed outlet. The lower extremity of the feed tray supporting member extends through an aperture 15 at the junction of cross members 16 and is thus retained in upright position.

Affixed to the feed tray surface and with its apex extending into the feed outlet, is a conical feed flow control member 2 symmetrically disposed about the feed tray supporting member and slidably engaged therewith at its apex. The base of the feed flow control member is secured to the feed tray by any suitable means (or formed integrally therewith) and the spaced relation of the conical wall of the feed control member and the feed outlet is varied with the vertical adjustment of the feed tray. Below the feed tray there is provide a tiltable feed platform 17, said platform being of symmetrical plan and pivotally supported along an axis of symmetry by oppositely disposed stub-axles 8, connected to feed platform frame members 9 and pivotally supported in apertures or recesses 8a in opposite uprights 10 of the supporting stand.

On one margin of the feed tray 3 is secured an upwardly extending member 11 (see Figs. 1 and 4) bearing adjacent its outer extremity a transverse pin 12 engaged in a slotted portion 13 of an adjacent upright 14 secured to one of the oppositely disposed feed platform frame members 9. The transverse pin 12, may be screw threaded at its outer extremity to receive a retaining nut 25. By virtue of arcuate movement of the upright 14, occasioned by tilting of the feed platform about its pivotal axis, a reciprocal movement is imparted to the upwardly extending member 11, (through its pin and slot engagement) with the upright 14, with consequent reciprocal lateral arcuate movement of the feed tray and connected conical feed control member, about the axis of the rod or tube 5. Such movement causing dry food in the feed bin to flow into the feed tray.

The feed platform surface 17 is formed of suitable sheet material supported by frame members 9 and transverse battens 18. The feed platform surface is cut away to clear the uprights 10 and permit a desired degree of tilting of the feed platform.

The legs 10 connected by cross-members 16 extend upwardly to support the bin 1. Preferably as illustrated in Figures 1 and 2 the uprights 10 are inclined and connected at their upper extremities to spacing blocks 20, making a flush contact with the cylindrical side wall of the bin.

The bin is suitably secured to the spacing blocks by means (not illustrated) such as for example by means of screws passing through the side wall of the bin.

The uprights 10 may also be adapted to be extended or retracted and as illustrated (see Fig. 2) the uprights 10 are slidably engaged with a channelled extension 21 and retained in any desired position by means of bolts and wing nuts 22.

In the preferred embodiment, an adjustable member 23 is provided on the pair of uprights 10 on opposite sides of the pivotal axis of the feed platform, said adjustable member having a stop 24 serving to limit the degree of tilting movement of the feed platform.

The adjustment of the height of the step 24 is achieved by movement of the slotted portion 26, relative to the bolt and wing nut 22, which is fixed in relation to the upright 10.

It will be appreciated that the bolt and wing nut 22 serve the joint purpose of securing the uprights 10 in relation to the channelled 21 and the position of the adjustable members 23 and attached stop 24. It will be appreciated that the mass of the feed platform is considerable in relation to the feed tray and return to balanced equilibrium after its displacement is thus secured. Furthermore, stock accustomed to seeking food from the dispensing apparatus approach at random either tiltable side of the tiltable feed platform thus securing pivotal movement thereof despite any temporary failure of the feed platform to return to its normal balanced position.

The invention, while applicable to stock-feeding generally, is particularly adapted for poultry feeding, and in such case the feed platform is arranged at a convenient height for fowls to hop thereon and cause it to tilt under the influence of their weight. Likewise the vertical distance between the feed platform and feed tray is such that a fowl standing on the platform has ready access thereto.

It will be appreciated that the apparatus is applicable to feeding pelleted or granular stock feed to all categories of stock and in the case of sheep, goats, pigs or the like, the height of the feed platform is such that the animals can step thereon, and gain access to the feed tray.

Modifications and variations may be made to suit differing stock feeding requirements without departing from the scope of the invention defined in the appendant claims.

What I claim is:

1. A dry-feed dispensing apparatus comprising supporting legs, cross-members defining an aperture at their junction, a cylindrical dry-feed bin secured to said supporting legs which in turn are connected by said cross-members to form a supporting framework, a feed tray, said dry-feed bin including a frustro-conical lower portion terminating in a gravity feed outlet defining a vertical axis and communicating with said feed tray, a cross-member within the dry-feed bin, a supporting rod suspended in the vertical axis of the feed outlet and supported by said cross-member, an adjustable screw threaded annular flange on said supporting rod, a conical feed flow control member including an apex secured to the feed tray and extending inwardly of the feed outlet and adjustably supported therewith by said adjustable screw threaded annular flange, said supporting rod extending downwardly through the aperture at the junction of the cross-members, a tiltable balanced feed platform defining a tilting axis, an upright member defining a vertical slot, a pin, feed flow actuating means consisting of a metal strip secured to the feed tray and extending upwardly therefrom, said metal strip bearing, adjacent its outer end, said pin transversely projecting and engaged in the vertical slot, said upright member being secured to a tiltable balanced feed platform at a point on its tilting axis and moveable therewith upon tilting movement of the feed platform in response to the weight of a feed-seeking entity thereon.

2. Dry-feed dispensing apparatus according to claim 1 wherein the supporting legs of the supporting framework are adapted to be extended or retracted and retained by locking means at a desired degree of extension.

3. Dry-feed dispensing apparatus according to claim 2 wherein the degree of movement of the pivotable feed platform is restrained by a limit stop secured to the supporting frame.

References Cited in the file of this patent

UNITED STATES PATENTS

| | | |
|---|---|---|
| 1,585,910 | Olson | May 25, 1926 |
| 1,733,831 | Sommers | Oct. 29, 1929 |
| 1,846,396 | Kegler | Feb. 23, 1932 |